United States Patent
McLeod

(10) Patent No.: US 12,551,186 B2
(45) Date of Patent: Feb. 17, 2026

(54) METHOD AND SYSTEM FOR AUTOMATIC TWO-DIMENSIONAL STANDARD VIEW DETECTION IN TRANSESOPHAGEAL ULTRASOUND IMAGES

(71) Applicant: GE Precision Healthcare LLC, Wauwatosa, WI (US)

(72) Inventor: Kristin Sarah McLeod, Oslo (NO)

(73) Assignee: GE Precision Healthcare LLC, Waukesha, WI (US)

( * ) Notice: Subject to any disclaimer, the term of this patent is extended or adjusted under 35 U.S.C. 154(b) by 301 days.

(21) Appl. No.: 17/667,725

(22) Filed: Feb. 9, 2022

(65) Prior Publication Data
US 2023/0248331 A1  Aug. 10, 2023

(51) Int. Cl.
A61B 8/12 (2006.01)
A61B 8/00 (2006.01)
A61B 8/08 (2006.01)

(52) U.S. Cl.
CPC ............... *A61B 8/12* (2013.01); *A61B 8/463* (2013.01); *A61B 8/465* (2013.01); *A61B 8/523* (2013.01)

(58) Field of Classification Search
CPC ........... A61B 8/12; A61B 8/463; A61B 8/465; A61B 8/523
See application file for complete search history.

(56) References Cited

U.S. PATENT DOCUMENTS

| | | | |
|---|---|---|---|
| 2005/0281444 A1* | 12/2005 | Lundberg | A61B 8/08 382/128 |
| 2010/0249589 A1* | 9/2010 | Lysyansky | A61B 8/466 600/440 |
| 2019/0261945 A1* | 8/2019 | Funka-Lea | A61B 90/37 |

* cited by examiner

*Primary Examiner* — Kaitlyn E Sebastian
(74) *Attorney, Agent, or Firm* — McAndrews, Held & Malloy, Ltd.; Daniel Bissing; David Bates

(57) ABSTRACT

Systems and methods for automatically detecting two-dimensional standard views in transesophageal ultrasound images are provided. The method includes acquiring a first ultrasound image at a first depth and a first omniplane angle. The first ultrasound image corresponds with a first standard view. The first omniplane angle is an angle different from zero (0) degrees. The method includes adjusting the first omniplane angle to a second omniplane angle of 0 degrees. The method includes acquiring a second ultrasound image at the first depth with the second omniplane angle. The method includes automatically analyzing the second ultrasound image to identify a second standard view corresponding with the second omniplane angle. The method includes automatically determining the first standard view based on the second standard view and the first omniplane angle. The method includes causing a display system to present the first ultrasound image with a first identifier of the first standard view.

20 Claims, 2 Drawing Sheets

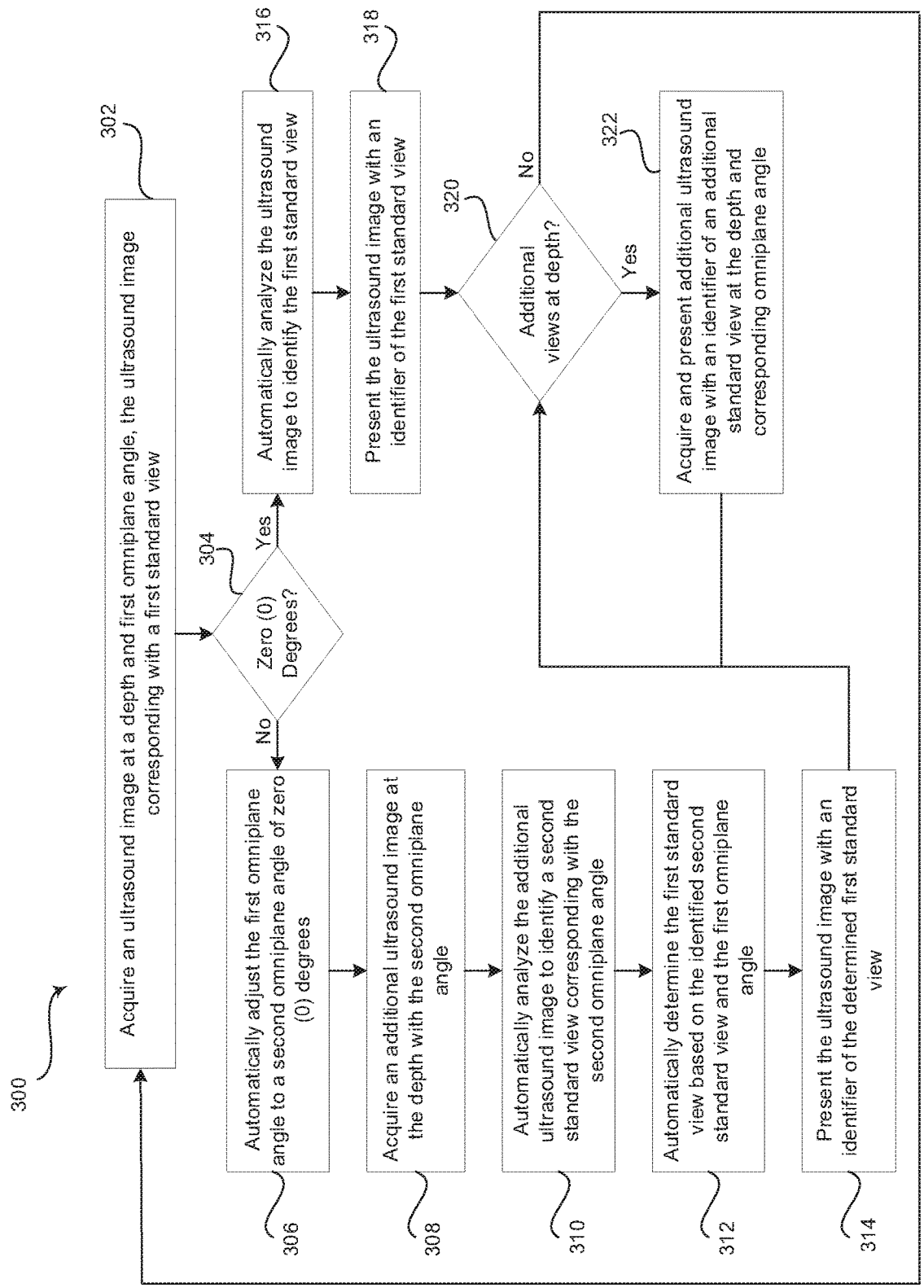

METHOD AND SYSTEM FOR AUTOMATIC TWO-DIMENSIONAL STANDARD VIEW DETECTION IN TRANSESOPHAGEAL ULTRASOUND IMAGES

FIELD

Certain embodiments relate to ultrasound imaging. More specifically, certain embodiments relate to a method and system for automatically detecting standard two-dimensional (2D) views at omniplane angles other than zero (0) degrees based on a detected standard 2D view at an omniplane angle of zero (0) degrees in transesophageal ultrasound images.

BACKGROUND

Ultrasound imaging is a medical imaging technique for imaging organs and soft tissues in a human body. Ultrasound imaging uses real time, non-invasive high frequency sound waves to produce a series of two-dimensional (2D) and/or three-dimensional (3D) images.

Transesophageal echocardiography (TEE) ultrasound provides detailed views of the heart and surrounding arteries. In contrast to a standard echocardiogram, a TEE ultrasound probe is attached to a thin tube that passes through a mouth, down a throat, and into an esophagus of a patient. The close proximity of the esophagus to the heart allows clear ultrasound images of the heart structure to be obtained. Unlike a standard echocardiogram, TEE includes twenty-two (22) standard views. Because the number of standard views is much larger in TEE than a standard echocardiogram, the number of images and time to train an artificial intelligence algorithm to automatically detect the standard views is substantially greater, which may also reduce the accuracy of a TEE standard view artificial intelligence detection algorithm.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for automatically detecting two-dimensional (2D) standard views in transesophageal ultrasound images, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 2 is a flow chart illustrating exemplary steps that may be utilized for automatically detecting two-dimensional (2D) standard views in transesophageal ultrasound images, in accordance with various embodiments.

DETAILED DESCRIPTION

Figure 1:
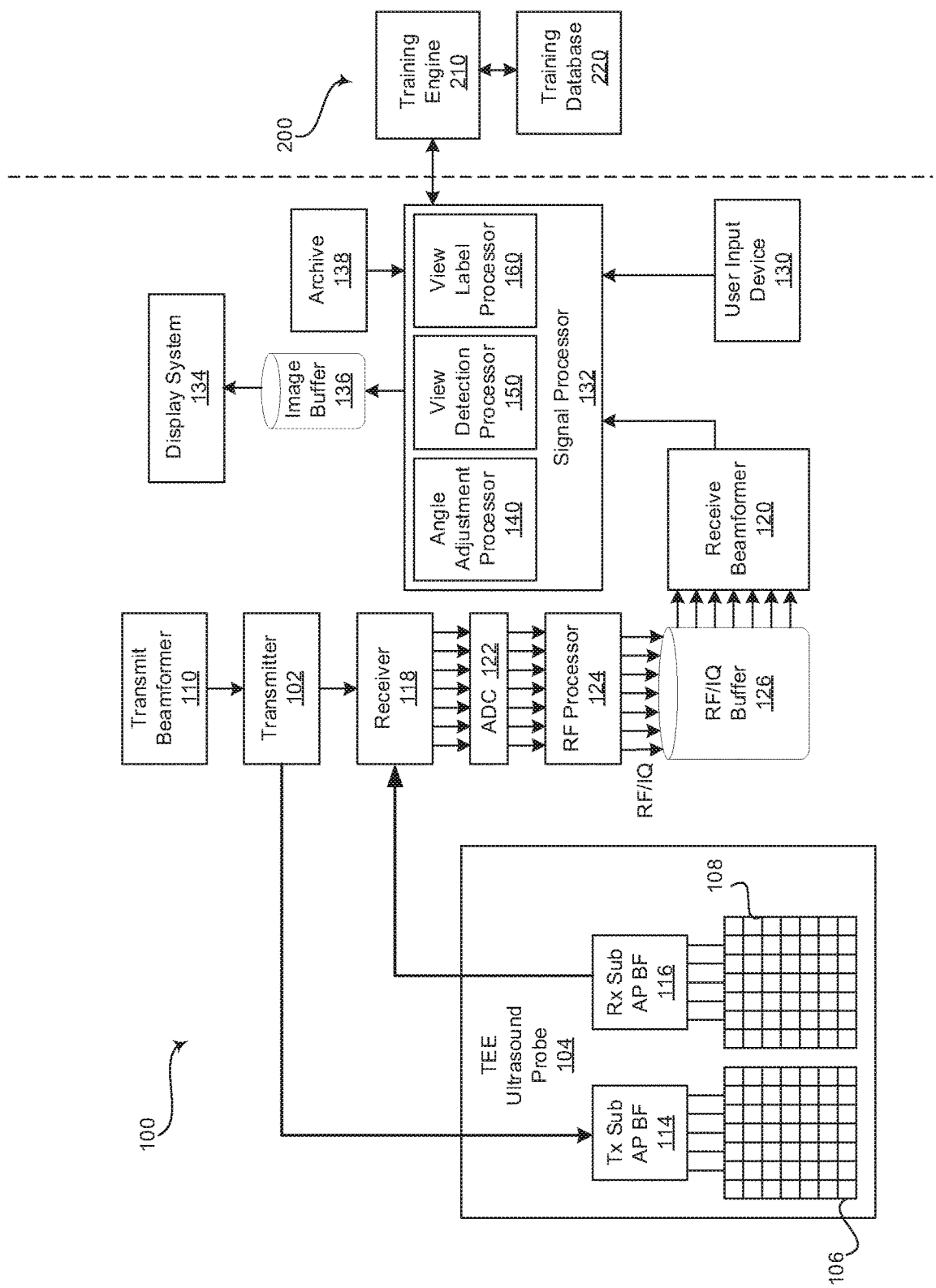
FIG. 1 is a block diagram of an exemplary ultrasound system that is operable to automatically detect two-dimensional (2D) standard views in transesophageal ultrasound images, in accordance with various embodiments.

Certain embodiments may be found in a method and system for automatically detecting two-dimensional (2D) standard views in transesophageal ultrasound images. Aspects of the present disclosure have the technical effect of automatically detecting standard views in a TEE ultrasound examination. Various embodiments have the technical effect of reducing a number of images needed to train an artificial intelligence algorithm for detecting standard views in a TEE ultrasound examination. Certain embodiments have the technical effect of improving accuracy of an artificial intelligence algorithm for detecting standard views in a TEE ultrasound examination. Aspects of the present disclosure have the technical effect of automatically detecting standard views in a TEE ultrasound examination based on an omniplane angle of a TEE ultrasound probe and an ultrasound image obtained at a zero (0) degree omniplane angle.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized, and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising", "including", or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode (2D mode), M-mode, three-dimensional (3D) mode, CF-mode, PW Doppler, CW Doppler, Contrast Enhanced Ultrasound (CEUS), and/or sub-modes of B-mode and/or CF such as Harmonic Imaging, Shear Wave Elasticity Imaging (SWEI), Strain Elastography, TVI, PDI, B-flow, MVI, UGAP, and in some cases also MM, CM, TVD where the "image" and/or "plane" includes a single beam or multiple beams.

Furthermore, the term processor or processing unit, as used herein, refers to any type of processing unit that can carry out the required calculations needed for the various embodiments, such as single or multi-core: CPU, Accelerated Processing Unit (APU), Graphic Processing Unit (GPU), DSP, FPGA, ASIC or a combination thereof.

Additionally, various embodiments describes particular omniplane angles in degrees, such as 0 degrees, 30 degrees, 60 degrees, 90 degrees, and 120 degrees. For purposes of the present disclosure, the particularly stated omniplane angles include a range of plus and minus 5 degrees from the stated omniplane angle. As an example, the omniplane angle of 90 degrees equates to an omniplane angle of 85-95 degrees, an omniplane angle of 30 degrees equates to an omniplane angle of 25-35 degrees, and so on.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". Also, forming of images may be performed using channel combinations that may originate from more than one transmit event (e.g., synthetic aperture techniques).

In various embodiments, ultrasound processing to form images is performed, for example, including ultrasound beamforming, such as receive beamforming, in software, firmware, hardware, or a combination thereof. One implementation of an ultrasound system having a software beamformer architecture formed in accordance with various embodiments is illustrated in FIG. 1.

FIG. 1 is a block diagram of an exemplary ultrasound system 100 that is operable to automatically detect two-dimensional (2D) standard views in transesophageal ultrasound images, in accordance with various embodiments. Referring to FIG. 1, there is shown an ultrasound system 100 and a training system 200. The ultrasound system 100 comprises a transmitter 102, a transesophageal echocardiography (TEE) ultrasound probe 104, a transmit beamformer 110, a receiver 118, a receive beamformer 120, A/D converters 122, a RF processor 124, a RF/IQ buffer 126, a user input device 130, a signal processor 132, an image buffer 136, a display system 134, and an archive 138.

The transmitter 102 may comprise suitable logic, circuitry, interfaces and/or code that may be operable to drive a TEE ultrasound probe 104. The TEE ultrasound probe 104 may comprise a two dimensional (2D) array of piezoelectric elements. The TEE ultrasound probe 104 may comprise a group of transmit transducer elements 106 and a group of receive transducer elements 108, that normally constitute the same elements. In certain embodiments, the TEE ultrasound probe 104 may be operable to acquire ultrasound image data covering at least a substantial portion of an anatomy, such as a heart or any suitable anatomical structure.

The transmit beamformer 110 may comprise suitable logic, circuitry, interfaces and/or code that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 108.

The group of receive transducer elements 108 in the TEE ultrasound probe 104 may be operable to convert the received echoes into analog signals, undergo sub-aperture beamforming by a receive sub-aperture beamformer 116 and are then communicated to a receiver 118. The receiver 118 may comprise suitable logic, circuitry, interfaces and/or code that may be operable to receive the signals from the receive sub-aperture beamformer 116. The analog signals may be communicated to one or more of the plurality of A/D converters 122.

The plurality of A/D converters 122 may comprise suitable logic, circuitry, interfaces and/or code that may be operable to convert the analog signals from the receiver 118 to corresponding digital signals. The plurality of A/D converters 122 are disposed between the receiver 118 and the RF processor 124. Notwithstanding, the disclosure is not limited in this regard. Accordingly, in some embodiments, the plurality of A/D converters 122 may be integrated within the receiver 118.

The RF processor 124 may comprise suitable logic, circuitry, interfaces and/or code that may be operable to demodulate the digital signals output by the plurality of A/D converters 122. In accordance with an embodiment, the RF processor 124 may comprise a complex demodulator (not shown) that is operable to demodulate the digital signals to form I/Q data pairs that are representative of the corresponding echo signals. The RF or I/Q signal data may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

The receive beamformer 120 may comprise suitable logic, circuitry, interfaces and/or code that may be operable to perform digital beamforming processing to, for example, sum the delayed channel signals received from RF processor 124 via the RF/IQ buffer 126 and output a beam summed signal. The resulting processed information may be the beam summed signal that is output from the receive beamformer 120 and communicated to the signal processor 132. In accordance with some embodiments, the receiver 118, the plurality of A/D converters 122, the RF processor 124, and the beamformer 120 may be integrated into a single beamformer, which may be digital. In various embodiments, the ultrasound system 100 comprises a plurality of receive beamformers 120.

The user input device 130 may be utilized to input patient data, input image acquisition parameters, modify settings, select protocols and/or templates, change scan mode, selectably navigate to other TEE standard views at a particular depth, and the like. In an exemplary embodiment, the user input device 130 may be operable to configure, manage and/or control operation of one or more components and/or modules in the ultrasound system 100. In this regard, the user input device 130 may be operable to configure, manage and/or control operation of the transmitter 102, the TEE ultrasound probe 104, the transmit beamformer 110, the receiver 118, the receive beamformer 120, the RF processor 124, the RF/IQ buffer 126, the user input device 130, the signal processor 132, the image buffer 136, the display system 134, and/or the archive 138. The user input device 130 may include button(s), rotary encoder(s), a touchscreen, motion tracking, voice recognition, a mousing device, keyboard, camera and/or any other device capable of receiving a user directive. In certain embodiments, one or more of the user input devices 130 may be integrated into other components, such as the display system 134 or the TEE ultrasound probe 104, for example. As an example, user input device 130 may include a touchscreen display.

The signal processor 132 may comprise suitable logic, circuitry, interfaces and/or code that may be operable to process ultrasound scan data (i.e., summed IQ signal) for generating ultrasound images for presentation on a display system 134. The signal processor 132 is operable to perform one or more processing operations according to a plurality of selectable ultrasound modalities on the acquired ultrasound scan data. In an exemplary embodiment, the signal processor 132 may be operable to perform display processing and/or control processing, among other things. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation. In various embodiments, the processed image data can be presented at the display system 134 and/or may be stored at the archive 138. The archive 138 may be a local archive, a Picture Archiving and Communication System (PACS), or any suitable device for storing images and related information.

The signal processor 132 may be one or more central processing units, graphic processing units, microprocessors, microcontrollers, and/or the like. The signal processor 132 may be an integrated component, or may be distributed across various locations, for example. In an exemplary embodiment, the signal processor 132 may comprise an angle adjustment processor 140, a view detection processor 150, and a view label processor 160 and may be capable of receiving input information from a user input device 130 and/or archive 138, generating an output displayable by a display system 134, and manipulating the output in response to input information from a user input device 130, among other things. The signal processor 132, angle adjustment processor 140, view detection processor 150, and view label processor 160 may be capable of executing any of the method(s) and/or set(s) of instructions discussed herein in accordance with the various embodiments, for example.

The ultrasound system 100 may be operable to continuously acquire ultrasound scan data at a frame rate that is suitable for the imaging situation in question. Typical frame rates range from 20-120 but may be lower or higher. The acquired ultrasound scan data may be displayed on the display system 134 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several minutes' worth of frames of ultrasound scan data. The frames of ultrasound scan data are stored in a manner to facilitate retrieval thereof according to its order or time of acquisition. The image buffer 136 may be embodied as any known data storage medium.

The signal processor 132 may include an angle adjustment processor 140 that comprises suitable logic, circuitry, interfaces and/or code that may be operable to determine an omniplane angle and facilitate omniplane angle adjustments during a TEE ultrasound examination. For example, the angle adjustment processor 140 may be operable to determine the omniplane angle based on user-selected image acquisition settings. As an example, an ultrasound operator may select a 90 degree omniplane angle setting when attempting to acquire a mid-esophageal two-chamber (2C) TEE standard view. The angle adjustment processor 140 may be configured to monitor and/or retrieve the omniplane angle setting to determine the omniplane angle.

As another example, the angle adjustment processor 140 may be configured to adjust the omniplane angle from an angle other than zero (0) degrees to an angle of zero (0) degrees to acquire an ultrasound image at the 0 degree omniplane angle. The ultrasound image acquired at the 0 degree omniplane angle may be provided to the view detection processor 150 to determine the TEE standard view provided by the ultrasound image acquired at the 0 degree omniplane angle. In various embodiments, the omniplane angle adjustment to 0 degrees to acquire the ultrasound image is performed in the background (e.g., without user knowledge, such as while the user is viewing the ultrasound image acquired at the initial omniplane angle setting). The angle adjustment processor 140 is configured to adjust the omniplane angle back to the previous non-zero omniplane angle setting after the ultrasound image is acquired at the 0 degree omniplane angle.

As another example, the angle adjustment processor 140 may be configured to present an option to navigate to other TEE standard views at the depth detected by the view detection processor 150, as described in more detail below. For example, the view detection processor 150 and/or view label processor 160 may determine that the ultrasound operator is viewing a transgastric two-chamber (2C) view at the selected omniplane angle of 90 degrees at the current depth of the TEE ultrasound probe 104. The angle adjustment processor 140 may be configured to provide user-selectable options for acquiring and presenting a transgastric mid-short axis TEE standard view (i.e., at a 0 degree omniplane angle), a transgastric long axis TEE standard view (i.e., at a 120 degree omniplane angle), or a transgastric right ventricle (RV) inflow TEE standard view (i.e., at a 120 degree omniplane angle with a probe rotation to the right), which are other TEE standard views available at the same depth as the transgastric two-chamber (2C) view the ultrasound operator is currently viewing. The angle adjustment processor 140 may be configured to adjust the omniplane angle in response to a user selection of a different TEE standard view at the current depth.

The signal processor 132 may include a view detection processor 150 that comprises suitable logic, circuitry, interfaces and/or code that may be operable to automatically analyze ultrasound images acquired at a zero (0) degree omniplane angle to detect a TEE standard view. TEE ultrasound examinations include nine (9) standard views at a zero (0) degree omniplane angle and at various depths. Specifically, the nine (9) standard views at the 0 degree omniplane angle include a hypopharynx TEE standard view, an upper esophageal aortic arch long axis TEE standard view, a mid-esophageal ascending aortic short axis TEE standard view, a mid-esophageal five chamber (5C) TEE standard view, a mid-esophageal four chamber (4C) TEE standard view, a mid-esophageal descending aortic short axis TEE standard view, a transgastric basal short axis TEE standard view, a transgastric mid-short axis TEE standard view, and a deep transgastric TEE standard view. Several of the 9 standard views have additional TEE standard views at different omniplane angles at the same depth. For example, the mid-esophageal ascending aortic long axis TEE standard view is located at an omniplane angle of 90 degrees at a same depth as the mid-esophageal ascending aortic short axis TEE standard view. As another example, the mid-esophageal aortic valve long axis TEE standard view at an omniplane angle of 120 degrees, the mid-esophageal right ventricle outflow tract TEE standard view at an omniplane angle of 60 degrees, and the mid-esophageal aortic valve short axis view at an omniplane angle of 30 degrees are all located at a same depth as the mid-esophageal 5C TEE standard view. Accordingly, by identifying a TEE standard view at a 0 degree omniplane angle, the view detection processor 150 is configured to identify a depth of the TEE ultrasound probe 104 associated with the detected TEE standard view, which provides information related to other TEE standard views available at the depth.

The view detection processor 150 may include image analysis algorithms, artificial intelligence algorithms, one or more deep neural networks (e.g., a convolutional neural network) and/or may utilize any suitable form of image analysis techniques or machine learning processing functionality configured to detect a TEE standard view depicted in an ultrasound image acquired at a 0 degree omniplane angle. The view detection processor 150 may provide the detected TEE standard view of the 0 degree ultrasound image to the view label processor 160 and/or store the 0 degree ultrasound image and the identification of the detected TEE ultrasound view at archive 138 and/or any suitable data storage medium. In various embodiments, the view detection processor 150 may be configured to provide the 0 degree ultrasound image and the identification of the detected TEE ultrasound view to the training database 220 of training system 200 for training the neurons of the deep neural network(s) (e.g., artificial intelligence model(s)) inferenced (i.e., deployed) by the view detection processor 150.

In various embodiments, the view detection processor 150 may be provided as a deep neural network that may be made up of, for example, an input layer, an output layer, and one or more hidden layers in between the input and output layers. Each of the layers may be made up of a plurality of processing nodes that may be referred to as neurons. For example, the view detection processor 150 may include an input layer having a neuron for each pixel or a group of pixels from an ultrasound image acquired at a 0 degree omniplane angle. The output layer may have neurons corresponding to TEE standard views. Each neuron of each layer may perform a processing function and pass the processed ultrasound image information to one of a plurality of neurons of a downstream layer for further processing. As an example, neurons of a first layer may learn to recognize edges of structure in the ultrasound image data. The neurons of a second layer may learn to recognize shapes based on the detected edges from the first layer. The neurons of a third layer may learn positions of the recognized shapes relative to landmarks in the ultrasound image data. The processing performed by the view detection processor 150 deep neural network (e.g., convolutional neural network) may identify a TEE standard view depicted in an ultrasound image acquired at a 0 degree omniplane angle with a high degree of probability.

The signal processor 132 may include a view label processor 160 that comprises suitable logic, circuitry, interfaces and/or code that may be operable to label the ultrasound image at the non-zero degree omniplane angle being viewed by the ultrasound operator with the TEE standard view based on the TEE standard view of the 0 degree ultrasound image detected by the view detection processor 150 and the non-zero degree omniplane angle provided by the angle adjustment processor 140. For example, the view label processor 160 may be configured to receive the identification of the TEE standard view of the 0 degree ultrasound image from the view detection processor 150 and the non-zero degree omniplane angle from the angle adjustment processor 140. The view label processor 160 may be configured to determine the TEE standard view of the ultrasound image presented at the display system 134 based on the omniplane angle of the ultrasound image being presented (i.e., provided by the angle adjustment processor 140) and the identification of the TEE standard view of the 0 degree ultrasound image provided by the view detection processor 150. For example, if the view detection processor 150 identifies the 0 degree ultrasound image as a mid-esophageal 4C TEE standard view and the ultrasound operator is viewing an ultrasound image at a 120 degree omniplane angle, the view label processor 160 may be configured to label the ultrasound image being presented at the display system 134 with a label identifying the ultrasound image as a mid-esophageal long axis TEE standard view, which is the TEE standard view at the 120 degree omniplane angle at a same depth as the mid-esophageal 4C TEE standard view. In other words, the signal processor 132 is configured to detect and identify non-zero degree omniplane angle TEE standard views without analyzing the ultrasound image of the non-zero degree omniplane angle TEE standard view. Instead, the signal processor 132 is configured to detect and identify non-zero degree omniplane angle TEE standard views based on the omniplane angle and analysis of the 0 degree omniplane angle ultrasound image at a same depth as the non-zero degree omniplane angle TEE standard view. The view label processor 160 may be configured to superimpose a label of the TEE standard view on the ultrasound image being presented at the display system 134. For example, the label may include text, numbers, symbols, and/or any suitable identifier of the TEE standard view.

In various embodiments, the view label processor 160 may be configured to present a prompt for an ultrasound operator to select a TEE standard view label. For example, the mid-esophageal 2C TEE standard view and mid-esophageal bicaval TEE standard view are both located at an omniplane angle of 90 degrees and a depth of the mid-esophageal 4C TEE standard view. The TEE ultrasound probe 104 is rotated to the right from the mid-esophageal 2C TEE standard view to obtain the mid-esophageal bicaval TEE standard view. The view label processor 160 may be configured to prompt the ultrasound operator to select the appropriate TEE standard view based on the TEE ultrasound probe 104 rotational position.

Still referring to FIG. 1, the display system 134 may be any device capable of communicating visual information to a user. For example, a display system 134 may include a liquid crystal display, a light emitting diode display, and/or any suitable display or displays. The display system 134 can be operable to present the ultrasound image at the omniplane angle selected by the ultrasound operator, the label of the TEE standard view depicted in the present ultrasound image, and/or any suitable information.

The archive 138 may be one or more computer-readable memories integrated with the ultrasound system 100 and/or communicatively coupled (e.g., over a network) to the ultrasound system 100, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive 138 may include databases, libraries, sets of information, or other storage accessed by and/or incorporated with the signal processor 132, for example. The archive 138 may be able to store data temporarily or permanently, for example. The archive 138 may be capable of storing medical image data, data generated by the signal processor 132, and/or instructions readable by the signal processor 132, among other things. In various embodiments, the archive 138 stores ultrasound images, TEE standard view labels, instructions for adjusting omniplane angles, instructions for identifying TEE standard views in ultrasound images acquired at a 0 degree omniplane angle, instructions for identifying TEE standard views of ultrasound images at non-zero omniplane angles based on the omniplane angle and an identification of a TEE standard view at a 0 degree omniplane angle at the same depth, instructions for labeling ultrasound images with TEE standard views, and/or any suitable images, information, and/or instructions, for example.

Components of the ultrasound system 100 may be implemented in software, hardware, firmware, and/or the like. The various components of the ultrasound system 100 may be communicatively linked. Components of the ultrasound system 100 may be implemented separately and/or integrated in various forms. For example, the display system 134 and the user input device 130 may be integrated as a touchscreen display.

Still referring to FIG. 1, the training system 200 may comprise a training engine 210 and a training database 220. The training engine 210 may comprise suitable logic, circuitry, interfaces and/or code that may be operable to train the neurons of the deep neural network(s) (e.g., artificial intelligence model(s)) inferenced (i.e., deployed) by the view detection processor 150. For example, the artificial intelligence model inferenced by the view detection processor 150 may be trained to automatically identify a TEE standard view depicted in an ultrasound image acquired at a 0 degree omniplane angle. As an example, the training engine 210 may train the deep neural networks deployed by the view detection processor 150 to automatically identify a TEE standard view depicted in an ultrasound image acquired at a 0 degree omniplane angle using database(s) 220 of classified TEE standard view ultrasound images at a 0 degree omniplane angle and at various depths.

In various embodiments, the databases 220 of training images may be a Picture Archiving and Communication System (PACS), or any suitable data storage medium. In certain embodiments, the training engine 210 and/or training image databases 220 may be remote system(s) communicatively coupled via a wired or wireless connection to the ultrasound system 100 as shown in FIG. 1. Additionally and/or alternatively, components or all of the training system 200 may be integrated with the ultrasound system 100 in various forms. In a representative embodiment, the databases 220 may receive training images from the view detection processor 150, among other image sources.

FIG. 2 is a flow chart 300 illustrating exemplary steps 302-322 that may be utilized for automatically detecting two-dimensional (2D) standard views in transesophageal ultrasound images, in accordance with various embodiments. Referring to FIG. 2, there is shown a flow chart 300 comprising exemplary steps 302 through 322. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 302, a TEE ultrasound probe 104 of an ultrasound system 100 acquires an ultrasound image at a depth and first omniplane angle, the ultrasound image corresponding with a first standard view. For example, the TEE ultrasound probe 104 may be navigated into an esophagus of a patient to obtain ultrasound images of a heart. The TEE ultrasound probe 104 may be set to an omniplane angle corresponding with a TEE standard view the ultrasound operator wishes to obtain. The acquired ultrasound image may be presented at a display system 134 of the ultrasound system 100.

At step 304, a signal processor 132 of the ultrasound system 100 may determine whether the omniplane angle is set to zero (0) degrees. For example, an angle adjustment processor 140 of the signal processor 132 may be configured to determine the omniplane angle based on user-selected image acquisition settings. As an example, an ultrasound operator may select a 90 degree omniplane angle setting when attempting to acquire a mid-esophageal two-chamber (2C) TEE standard view. The angle adjustment processor 140 may be configured to monitor and/or retrieve the omniplane angle setting to determine the omniplane angle. The angle adjustment processor 140 may be configured to provide the detected omniplane angle to the view label processor 160. If the omniplane angle detected by the angle adjustment processor 140 is zero (0) degrees, the process 300 proceeds to step 316. If the omniplane angle detected by the angle adjustment processor 140 is not zero (0) degrees, the process 300 proceeds to step 306.

At step 306, the signal processor 132 of the ultrasound system 100 may automatically adjust the first omniplane angle to a second omniplane angle of zero (0) degrees when the signal processor 132 determines at step 304 that the initial omniplane angle is not zero (0) degrees. For example, the angle adjustment processor 150 of the signal processor 132 may be configured to adjust the omniplane angle from an angle other than zero (0) degrees to an angle of zero (0) degrees to acquire an ultrasound image at the 0 degree omniplane angle. In various embodiments, the omniplane angle adjustment to 0 degrees to acquire the ultrasound image is performed in the background (e.g., without user knowledge, such as while the user is viewing the ultrasound image acquired at the initial omniplane angle setting).

At step 308, the ultrasound system 100 may acquire an additional ultrasound image at the depth with the second omniplane angle. For example, the TEE ultrasound probe 104, set to the 0 degree omniplane angle at step 306, acquires an ultrasound image, which may be provided to the view detection processor 150 to determine the TEE standard view provided by the ultrasound image acquired at the 0 degree omniplane angle. The angle adjustment processor 140 is configured to adjust the omniplane angle back to the previous non-zero omniplane angle setting after the ultrasound image is acquired at the 0 degree omniplane angle.

At step 310, the signal processor 132 of the ultrasound system 100 may automatically analyze the additional ultrasound image to identify a second standard view corresponding with the second omniplane angle. For example, a view detection processor 150 of the signal processor 132 may be configured to automatically analyze the ultrasound image acquired at a zero (0) degree omniplane angle at step 308 to detect a TEE standard view. The view detection processor 150 may include image analysis algorithms, artificial intelligence algorithms, one or more deep neural networks (e.g., a convolutional neural network) and/or may utilize any suitable form of image analysis techniques or machine learning processing functionality configured to detect a TEE standard view depicted in an ultrasound image acquired at a 0 degree omniplane angle. The view detection processor 150 may provide the detected TEE standard view of the 0 degree ultrasound image to the view label processor 160 and/or store the 0 degree ultrasound image and the identification of the detected TEE ultrasound view at archive 138 and/or any suitable data storage medium. In various embodiments, the view detection processor 150 may be configured to provide the 0 degree ultrasound image and the identification of the detected TEE ultrasound view to the training database 220 of training system 200 for training the neurons of the deep neural network(s) (e.g., artificial intelligence model(s)) inferenced (i.e., deployed) by the view detection processor 150.

At step 312, the signal processor 132 of the ultrasound system 100 may automatically determine the first standard view based on the identified second standard view and the first omniplane angle. For example, a view label processor 160 of the signal processor 132 may be configured to receive the identification of the TEE standard view of the 0 degree ultrasound image from the view detection processor 150 at step 312 and the non-zero degree omniplane angle from the angle adjustment processor 140 at step 304. The view label processor 160 may be configured to determine the TEE standard view of the ultrasound image presented at the display system 134 based on the omniplane angle of the ultrasound image being presented (i.e., provided by the angle adjustment processor 140) and the identification of the TEE standard view of the 0 degree ultrasound image provided by the view detection processor 150. For example, if the view detection processor 150 identifies the 0 degree ultrasound image as a mid-esophageal 4C TEE standard view and the ultrasound operator is viewing an ultrasound image at a 120 degree omniplane angle, the view label processor 160 may be configured to determine the ultrasound image being presented at the display system 134 is a mid-esophageal long axis TEE standard view, which is the TEE standard view at the 120 degree omniplane angle at a same depth as the mid-esophageal 4C TEE standard view.

At step 314, the signal processor 132 may cause a display system of the ultrasound system 100 to present the ultrasound image with an identifier of the determined first standard view. For example, the view label processor 160 of the signal processor 132 may be configured to superimpose a label of the TEE standard view on the ultrasound image being presented at the display system 134. For example, the label may include text, numbers, symbols, and/or any suitable identifier of the TEE standard view. In various embodiments, the view label processor 160 may be configured to prompt a user selection of the TEE standard view, such as if multiple TEE standard views are available at a same depth and omniplane angle. For example, the view label processor 160 may be configured to prompt the ultrasound operator to select the appropriate TEE standard view based on the TEE ultrasound probe 104 rotational position.

At step 316, the signal processor 132 of the ultrasound system 100 may automatically analyze the ultrasound image to identify the first standard view when the signal processor 132 determines at step 304 that the initial omniplane angle is zero (0) degrees. For example, a view detection processor 150 of the signal processor 132 may be configured to automatically analyze the ultrasound image acquired at a zero (0) degree omniplane angle at step 302 to detect a TEE standard view. The view detection processor 150 may include image analysis algorithms, artificial intelligence algorithms, one or more deep neural networks (e.g., a convolutional neural network) and/or may utilize any suitable form of image analysis techniques or machine learning processing functionality configured to detect a TEE standard view depicted in an ultrasound image acquired at a 0 degree omniplane angle. The view detection processor 150 may provide the detected TEE standard view of the 0 degree ultrasound image to the view label processor 160 and/or store the 0 degree ultrasound image and the identification of the detected TEE ultrasound view at archive 138 and/or any suitable data storage medium. In various embodiments, the view detection processor 150 may be configured to provide the 0 degree ultrasound image and the identification of the detected TEE ultrasound view to the training database 220 of training system 200 for training the neurons of the deep neural network(s) (e.g., artificial intelligence model(s)) inferenced (i.e., deployed) by the view detection processor 150.

At step 318, the signal processor 132 may cause a display system 134 of the ultrasound system 100 to present the ultrasound image with an identifier of the determined first standard view. For example, the view label processor 160 of the signal processor 132 may be configured to overlay a label of the TEE standard view on the ultrasound image being presented at the display system 134. As an example, the label may include text, numbers, symbols, and/or any suitable identifier of the TEE standard view.

At step 320, the signal processor 132 of the ultrasound system 100 may determine whether additional TEE standard views are available at the depth of the TEE ultrasound probe 104. For example, the angle adjustment processor 140 of the signal processor 132 may be configured to present an option to navigate to other TEE standard views at the depth detected by the view detection processor 150, as described in more detail below. For example, the view detection processor 150 and/or view label processor 160 may determine that the ultrasound operator is viewing a transgastric two-chamber (2C) view at the selected omniplane angle of 90 degrees at the current depth of the TEE ultrasound probe 104. The angle adjustment processor 140 may be configured to provide user-selectable options for acquiring and presenting a transgastric mid-short axis TEE standard view (i.e., at a 0 degree omniplane angle), a transgastric long axis TEE standard view (i.e., at a 120 degree omniplane angle), or a transgastric right ventricle (RV) inflow TEE standard view (i.e., at a 120 degree omniplane angle with a probe rotation to the right), which are other TEE standard views available at the same depth as the transgastric two-chamber (2C) view the ultrasound operator is currently viewing. If additional views at the depth are available and desired, the process 300 proceeds to step 322. If additional views at the depth are not available and/or not desired, the process 300 returns to step 302 if additional views at a different depth are desired. The process 300 ends once all of the desired TEE standard views have been acquired.

At step 322, if additional views at the depth are available and desired, the ultrasound system may acquire and present an additional ultrasound with an identifier of an additional TEE standard view at the depth and corresponding omniplane angle. For example, if an ultrasound operator selects an option to navigate to a different TEE standard view at a different omniplane angle and same depth, at step 320 the angle adjustment processor 140 may be configured to adjust the omniplane angle in response to the user selection of the different TEE standard view at the current depth. The TEE ultrasound probe 104, set to the different omniplane angle by the angle adjustment processor 140, acquires the ultrasound image of the different TEE standard view. The view label processor 160 may be configured to label the acquired ultrasound image with the different standard view for presentation at the display system 134. The process 300 then returns to step 320 to determine whether additional TEE standard views are available and/or desired at the depth of the TEE ultrasound probe 104.

Aspects of the present disclosure provide a method 300 and system 100 for automatically detecting two-dimensional (2D) standard views in transesophageal ultrasound images. In accordance with various embodiments, the method 300 may comprise acquiring 302, by an ultrasound probe 104 of an ultrasound system 100, a first ultrasound image at a first depth and a first omniplane angle. The first ultrasound image corresponds with a first standard view. The first omniplane angle is an angle different from zero (0) degrees. The method 300 may comprise adjusting 306, by at least one processor 132, 140, the first omniplane angle to a second omniplane angle of zero (0) degrees. The method 300 may comprise acquiring 308, by the ultrasound probe 104, a second ultrasound image at the first depth with the second omniplane angle. The method 300 may comprise automatically analyzing 310, by the at least one processor 132, 150, the second ultrasound image to identify a second standard view corresponding with the second omniplane angle. The method 300 may comprise automatically determining 312, by the at least one processor 132, 160, the first standard view based on the second standard view and the first omniplane angle. The method 300 may comprise causing 314, by the at least one processor 132, 160, a display system 134 to present the first ultrasound image with a first identifier of the first standard view.

In a representative embodiment, the method 300 may comprise acquiring 302, by the ultrasound probe 104, a third ultrasound image at a second depth and the second omniplane angle. The ultrasound image corresponds with a third standard view. The method 300 may comprise automatically analyzing 316, by the at least one processor 132, 150, the third ultrasound image to identify the third standard view. The method 300 may comprise causing 318, by the at least one processor 132, 160, the display system 134 to present the third ultrasound image with a second identifier of the third standard view. In an exemplary embodiment, the method 300 may comprise causing 320, by the at least one processor 132, 140, the display system 134 to present a selectable option for navigating to one or more additional standard views at the second depth. The method 300 may comprise receiving 320, by the at least one processor 132, 140, a user selection of one of the one or more additional standard views at the second depth. The method 300 may comprise adjusting 322, by the at least one processor 132, 140, the second omniplane angle to a third omniplane angle corresponding with the user selection of the one of the one or more additional standard views at the second depth. The method 300 may comprise acquiring 322, by the ultrasound probe 104, a fourth ultrasound image at the third omniplane angle and the second depth. The method 300 may comprise causing 322, by the at least one processor 132, 160, the display system 134 to present the fourth ultrasound image with a third identifier of the one of the one or more additional standard views. In various embodiments, the method 300 comprises providing 310, 316, by the at least one processor 132, 150, one or both of the second ultrasound image at the first depth with the second omniplane angle or the third ultrasound image at the second depth and the second omniplane angle to a training database 220 of a training system 200. In certain embodiments, the method 300 may comprise causing 320, by the at least one processor 132, 140, the display system 134 to present a selectable option for navigating to one or more additional standard views at the first depth. The method 300 may comprise receiving 320, by the at least one processor 132, 140, a user selection of one of the one or more additional standard views at the first depth. The method 300 may comprise adjusting 322, by the at least one processor 132, 140, the first omniplane angle to a third omniplane angle corresponding with the user selection of the one of the one or more additional standard views at the first depth. The method 300 may comprise acquiring 322, by the ultrasound probe 104, a third ultrasound image at the third omniplane angle and the first depth. The method 300 may comprise causing 322, by the at least one processor 132, 160, the display system 134 to present the third ultrasound image with a second identifier of the one of the one or more additional standard views. In a representative embodiment, the ultrasound probe 104 is a transesophageal echocardiography (TEE) ultrasound probe. In an exemplary embodiment, the method 300 may comprise providing 310, by the at least one processor 132, 150, the second ultrasound image at the first depth with the second omniplane angle to a training database 220 of a training system 200. In certain embodiments, the method 300 may comprise refraining from presenting the second ultrasound image at the first depth with the second omniplane angle at the display system 134.

Various embodiments provide a system 100 for automatically detecting two-dimensional (2D) standard views in transesophageal ultrasound images. The system 100 may comprise an ultrasound probe 104, at least one processor 132, 140, 150, 160, and a display system 134. The ultrasound probe 104 may be configured to acquire a first ultrasound image at a first depth and a first omniplane angle. The first ultrasound image corresponds with a first standard view. The first omniplane angle is an angle different from zero (0) degrees. The ultrasound probe 104 may be configured to acquire a second ultrasound image at the first depth with a second omniplane angle of zero (0) degrees. The at least one processor 132, 140 may be configured to adjust the first omniplane angle to the second omniplane angle. The at least one processor 132, 150 may be configured to automatically analyze the second ultrasound image to identify a second standard view corresponding with the second omniplane angle. The at least one processor 132, 160 may be configured to automatically determine the first standard view based on the second standard view and the first omniplane angle. The display system 134 may be configured to present the first ultrasound image with a first identifier of the first standard view.

In an exemplary embodiment, the ultrasound probe 104 is operable to acquire a third ultrasound image at a second depth and the second omniplane angle. The ultrasound image corresponds with a third standard view. The at least one processor 132, 150 is configured to automatically analyze the third ultrasound image to identify the third standard view. The display system 134 is configured to present the third ultrasound image with a second identifier of the third standard view. In various embodiments, the display system 134 is configured to present a selectable option for navigating to one or more additional standard views at the second depth. The at least one processor 132, 140 is configured to receive a user selection of one of the one or more additional standard views at the second depth. The at least one processor 132, 140 is configured to adjust the second omniplane angle to a third omniplane angle corresponding with the user selection of the one of the one or more additional standard views at the second depth. The ultrasound probe 104 is configured to acquire a fourth ultrasound image at the third omniplane angle and the second depth. The display system 134 is configured to present the fourth ultrasound image with a third identifier of the one of the one or more additional standard views. In certain embodiments, the at least one processor 132, 150 is configured to provide one or both of the second ultrasound image at the first depth with the second omniplane angle or the third ultrasound image at the second depth and the second omniplane angle to a training database 220 of a training system 200. In a representative embodiment, the display system 134 is configured to present a selectable option for navigating to one or more additional standard views at the first depth. The at least one processor 132, 140 is configured to receive a user selection of one of the one or more additional standard views at the first depth. The at least one processor 132, 140 is configured to adjust the first omniplane angle to a third omniplane angle corresponding with the user selection of the one of the one or more additional standard views at the first depth. The ultrasound probe 104 is configured to acquire a third ultrasound image at the third omniplane angle and the first depth. The display system 134 is configured to present the third ultrasound image with a second identifier of the one of the one or more additional standard views. In an exemplary embodiment, the ultrasound probe 104 is a transesophageal echocardiography (TEE) ultrasound probe. In various embodiments, the display system 134 is configured to refrain from presenting the second ultrasound image at the first depth with the second omniplane angle.

Certain embodiments provide a non-transitory computer readable medium having stored thereon, a computer program having at least one code section. The at least one code section is executable by a machine for causing an ultrasound system 100 to perform steps 300. The steps 300 may comprise receiving 302, from an ultrasound probe 104 of the ultrasound system 100, a first ultrasound image at a first depth and a first omniplane angle. The first ultrasound image corresponds with a first standard view. The first omniplane angle is an angle different from zero (0) degrees. The steps 300 may comprise adjusting 306 the first omniplane angle to a second omniplane angle of zero (0) degrees. The steps 300 may comprise receiving 308, from the ultrasound probe 104, a second ultrasound image at the first depth with the second omniplane angle. The steps 300 may comprise automatically analyzing 310 the second ultrasound image to identify a second standard view corresponding with the second omniplane angle. The steps 300 may comprise automatically determining 312 the first standard view based on the second standard view and the first omniplane angle. The steps 300 may comprise causing 314 a display system 134 to present the first ultrasound image with a first identifier of the first standard view.

In various embodiments, the steps 300 may comprise receiving 302, from the ultrasound probe 104, a third ultrasound image at a second depth and the second omniplane angle. The ultrasound image corresponds with a third standard view. The steps 300 may comprise automatically analyzing 316 the third ultrasound image to identify the third standard view. The steps 300 may comprise causing 318 the display system 134 to present the third ultrasound image with a second identifier of the third standard view. In certain embodiments, the steps 300 may comprise causing 320 the display system 134 to present a selectable option for navigating to one or more additional standard views at the first depth. The steps 300 may comprise receiving 320 a user selection of one of the one or more additional standard views at the first depth. The steps 300 may comprise adjusting 322 the first omniplane angle to a third omniplane angle corresponding with the user selection of the one of the one or more additional standard views at the first depth. The steps 300 may comprise receiving 322, from the ultrasound probe 104, a third ultrasound image at the third omniplane angle and the first depth. The steps 300 may comprise causing 322 the display system 134 to present the third ultrasound image with a second identifier of the one of the one or more additional standard views. In a representative embodiment, the steps 300 may comprise providing 310, by the at least one processor 132, 150, the second ultrasound image at the first depth with the second omniplane angle to a training database 220 of a training system 200. In an exemplary embodiment, the steps 300 may comprise refraining from presenting the second ultrasound image at the first depth with the second omniplane angle at the display system 134.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" and/or "configured" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for automatically detecting two-dimensional (2D) standard views in transesophageal ultrasound images.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

Various embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
acquiring, by an ultrasound probe of an ultrasound system, a first ultrasound image at a first depth and a first omniplane angle, the first ultrasound image corresponding with a first standard view, wherein the first omniplane angle is an angle different from zero (0) degrees;
adjusting, by at least one processor, the first omniplane angle to a second omniplane angle of zero (0) degrees;
acquiring, by the ultrasound probe, a second ultrasound image at the first depth with the second omniplane angle;
automatically analyzing, by the at least one processor, the second ultrasound image to identify a second standard view corresponding with the second omniplane angle;
automatically determining, by the at least one processor, the first standard view based on the second standard view and the first omniplane angle; and
causing, by the at least one processor, a display system to present the first ultrasound image with a first identifier of the first standard view.

2. The method of claim 1, comprising:
acquiring, by the ultrasound probe, a third ultrasound image at a second depth and the second omniplane angle, the ultrasound image corresponding with a third standard view;
automatically analyzing, by the at least one processor, the third ultrasound image to identify the third standard view; and
causing, by the at least one processor, the display system to present the third ultrasound image with a second identifier of the third standard view.

3. The method of claim 2, comprising:
causing, by the at least one processor, the display system to present a selectable option for navigating to one or more additional standard views at the second depth;
receiving, by the at least one processor, a user selection of one of the one or more additional standard views at the second depth;
adjusting, by the at least one processor, the second omniplane angle to a third omniplane angle corresponding with the user selection of the one of the one or more additional standard views at the second depth;
acquiring, by the ultrasound probe, a fourth ultrasound image at the third omniplane angle and the second depth; and
causing, by the at least one processor, the display system to present the fourth ultrasound image with a third identifier of the one of the one or more additional standard views.

4. The method of claim 2, comprising providing, by the at least one processor, one or both of the second ultrasound image at the first depth with the second omniplane angle or the third ultrasound image at the second depth and the second omniplane angle to a training database of a training system.

5. The method of claim 1, comprising:
causing, by the at least one processor, the display system to present a selectable option for navigating to one or more additional standard views at the first depth;
receiving, by the at least one processor, a user selection of one of the one or more additional standard views at the first depth;
adjusting, by the at least one processor, the first omniplane angle to a third omniplane angle corresponding with the user selection of the one of the one or more additional standard views at the first depth;
acquiring, by the ultrasound probe, a third ultrasound image at the third omniplane angle and the first depth; and
causing, by the at least one processor, the display system to present the third ultrasound image with a second identifier of the one of the one or more additional standard views.

6. The method of claim 1, wherein the ultrasound probe is a transesophageal echocardiography (TEE) ultrasound probe.

7. The method of claim 1, comprising providing, by the at least one processor, the second ultrasound image at the first depth with the second omniplane angle to a training database of a training system.

8. The method of claim 1, comprising refraining from presenting the second ultrasound image at the first depth with the second omniplane angle at the display system.

9. An ultrasound system comprising:
an ultrasound probe configured to:
acquire a first ultrasound image at a first depth and a first omniplane angle, the first ultrasound image corresponding with a first standard view, wherein the first omniplane angle is an angle different from zero (0) degrees; and
acquire a second ultrasound image at the first depth with a second omniplane angle of zero (0) degrees;
at least one processor configured to:
adjust the first omniplane angle to the second omniplane angle;
automatically analyze the second ultrasound image to identify a second standard view corresponding with the second omniplane angle; and
automatically determine the first standard view based on the second standard view and the first omniplane angle; and
a display system configured to present the first ultrasound image with a first identifier of the first standard view.

10. The ultrasound system of claim 9, wherein:
the ultrasound probe is operable to acquire a third ultrasound image at a second depth and the second omniplane angle, the ultrasound image corresponding with a third standard view;
the at least one processor is configured to automatically analyze the third ultrasound image to identify the third standard view; and
the display system is configured to present the third ultrasound image with a second identifier of the third standard view.

11. The ultrasound system of claim 10, wherein:
the display system is configured to present a selectable option for navigating to one or more additional standard views at the second depth;
the at least one processor is configured to receive a user selection of one of the one or more additional standard views at the second depth;

the at least one processor is configured to adjust the second omniplane angle to a third omniplane angle corresponding with the user selection of the one of the one or more additional standard views at the second depth;

the ultrasound probe is configured to acquire a fourth ultrasound image at the third omniplane angle and the second depth; and the display system is configured to present the fourth ultrasound image with a third identifier of the one of the one or more additional standard views.

12. The ultrasound system of claim 10, wherein the at least one processor is configured to provide one or both of the second ultrasound image at the first depth with the second omniplane angle or the third ultrasound image at the second depth and the second omniplane angle to a training database of a training system.

13. The ultrasound system of claim 9, wherein:
the display system is configured to present a selectable option for navigating to one or more additional standard views at the first depth;
the at least one processor is configured to receive a user selection of one of the one or more additional standard views at the first depth;
the at least one processor is configured to adjust the first omniplane angle to a third omniplane angle corresponding with the user selection of the one of the one or more additional standard views at the first depth;
the ultrasound probe is configured to acquire a third ultrasound image at the third omniplane angle and the first depth; and
the display system is configured to present the third ultrasound image with a second identifier of the one of the one or more additional standard views.

14. The ultrasound system of claim 9, wherein the ultrasound probe is a transesophageal echocardiography (TEE) ultrasound probe.

15. The ultrasound system of claim 9, wherein the display system is configured to refrain from presenting the second ultrasound image at the first depth with the second omniplane angle.

16. A non-transitory computer readable medium having stored thereon, a computer program having at least one code section, the at least one code section being executable by a machine for causing an ultrasound system to perform steps comprising:
receiving, from an ultrasound probe of the ultrasound system, a first ultrasound image at a first depth and a first omniplane angle, the first ultrasound image corresponding with a first standard view, wherein the first omniplane angle is an angle different from zero (0) degrees;
adjusting the first omniplane angle to a second omniplane angle of zero (0) degrees;
receiving, from the ultrasound probe, a second ultrasound image at the first depth with the second omniplane angle;
automatically analyzing the second ultrasound image to identify a second standard view corresponding with the second omniplane angle;
automatically determining the first standard view based on the second standard view and the first omniplane angle; and
causing a display system to present the first ultrasound image with a first identifier of the first standard view.

17. The non-transitory computer readable medium of claim 16, comprising:
receiving, from the ultrasound probe, a third ultrasound image at a second depth and the second omniplane angle, the ultrasound image corresponding with a third standard view;
automatically analyzing the third ultrasound image to identify the third standard view; and
causing the display system to present the third ultrasound image with a second identifier of the third standard view.

18. The non-transitory computer readable medium of claim 16, comprising:
causing the display system to present a selectable option for navigating to one or more additional standard views at the first depth;
receiving a user selection of one of the one or more additional standard views at the first depth;
adjusting the first omniplane angle to a third omniplane angle corresponding with the user selection of the one of the one or more additional standard views at the first depth;
receiving, from the ultrasound probe, a third image at the third omniplane angle and the first depth; and
causing the display system to present the third ultrasound image with a second identifier of the one of the one or more additional standard views.

19. The non-transitory computer readable medium of claim 16, comprising providing, by the at least one processor, the second ultrasound image at the first depth with the second omniplane angle to a training database of a training system.

20. The non-transitory computer readable medium of claim 16, comprising refraining from presenting the second ultrasound image at the first depth with the second omniplane angle at the display system.

* * * * *